US012544608B2

(12) United States Patent
Arnette

(10) Patent No.: US 12,544,608 B2
(45) Date of Patent: Feb. 10, 2026

(54) HERMETICALLY SEALED PORTABLE FIRE EXTINGUISHER WITH PRESSURE INDICATOR

(71) Applicant: UTC Fire & Security Corporation, Farmington, CT (US)

(72) Inventor: Henry Arnette, Mebane, NC (US)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 0 days.

(21) Appl. No.: 18/100,309

(22) Filed: Jan. 23, 2023

(65) Prior Publication Data

US 2023/0158349 A1 May 25, 2023

Related U.S. Application Data

(62) Division of application No. 16/109,055, filed on Aug. 22, 2018, now Pat. No. 11,559,712, which is a division of application No. 15/074,234, filed on Mar. 18, 2016, now Pat. No. 10,105,562.

(60) Provisional application No. 62/139,855, filed on Mar. 30, 2015.

(51) Int. Cl.
*A62C 13/64* (2006.01)
*A62C 37/50* (2006.01)
*B65B 31/00* (2006.01)

(52) U.S. Cl.
CPC .............. *A62C 13/64* (2013.01); *A62C 37/50* (2013.01); *B65B 31/003* (2013.01)

(58) Field of Classification Search
CPC ....... A62C 13/64; A62C 13/00; A62C 13/003; A62C 13/62; A62C 13/76; A62C 37/50; B65D 1/20; B65D 7/40; B65D 77/10–2096; B65D 83/42; B65D 83/425; B65D 2501/0072; B65D 83/38; B65D 23/00; B65D 1/023; B65D 41/0414; F17C 5/06; F17C 13/04; B65B 31/003–028
USPC ...................................................... 169/71–89
See application file for complete search history.

(56) References Cited

U.S. PATENT DOCUMENTS 2,077,872 A * 4/1937 Boyd .................. A62C 13/003 169/87
2,621,827 A 12/1952 Clifford
2,694,456 A 11/1954 Huthsing
2,876,846 A 3/1959 Howard
3,589,446 A 6/1971 Bower
(Continued)

FOREIGN PATENT DOCUMENTS

DE 3609499 A1 9/1987
EP 0953367 A2 11/1999
(Continued)

*Primary Examiner* — Arthur O. Hall
*Assistant Examiner* — Juan C Barrera
(74) *Attorney, Agent, or Firm* — Troutman Pepper Locke LLP; Scott D. Wofsy; Gabrielle L. Gelozin

(57) ABSTRACT

A portable fire extinguisher is disclosed which includes a cylinder for storing a pressurized fire extinguishing agent and has a neck portion defining an outlet, and a flexible hermetic seal supported across the outlet of the cylinder, wherein the flexible hermetic seal is adapted and configured to transition between: an unexpanded condition corresponding to an unpressurized cylinder; an expanded condition corresponding to a pressurized cylinder; and a bursted condition corresponding to an opened cylinder.

6 Claims, 15 Drawing Sheets

(56) References Cited

U.S. PATENT DOCUMENTS

| | | | | | |
|---|---|---|---|---|---|
| 3,613,793 | A * | 10/1971 | Huthsing, Jr. | A62C 35/605 169/42 |
| 3,643,691 | A | 2/1972 | Huthsing, Jr. | |
| 3,702,637 | A | 11/1972 | Bower | |
| 3,814,298 | A | 6/1974 | Hansen | |
| 3,815,421 | A | 6/1974 | Harland et al. | |
| 3,861,474 | A | 1/1975 | De Palma | |
| 4,191,056 | A | 3/1980 | Holden | |
| 4,620,598 | A | 11/1986 | Reeder | |
| 4,667,517 | A | 5/1987 | Holden | |
| 4,862,968 | A | 9/1989 | Woodman | |
| 5,320,255 | A * | 6/1994 | Stoffel | B65D 83/42 222/402.1 |
| 5,660,236 | A | 8/1997 | Sears et al. | |
| 5,816,331 | A | 10/1998 | Vivier | |
| 5,848,649 | A | 12/1998 | Matsumoto et al. | |
| 7,082,999 | B2 | 8/2006 | Arnot | |
| 7,140,381 | B2 | 11/2006 | Sundholm et al. | |
| 8,448,716 | B2 | 5/2013 | Yoshida | |
| 8,496,067 | B2 * | 7/2013 | Koelewijn | A62C 5/006 169/29 |
| 8,651,194 | B2 | 2/2014 | Yoshida | |
| 2004/0194974 | A1 | 10/2004 | Arnot | |
| 2007/0029096 | A1 | 2/2007 | Zuev et al. | |
| 2009/0173506 | A1 | 7/2009 | Yoshida | |
| 2010/0132967 | A1 | 6/2010 | Yoshida | |
| 2011/0214885 | A1 | 9/2011 | Mauney | |
| 2012/0325503 | A1 | 12/2012 | Fishman et al. | |
| 2013/0014964 | A1 | 1/2013 | Yoshida | |

FOREIGN PATENT DOCUMENTS

| | | | |
|---|---|---|---|
| EP | 2620183 | A2 | 7/2013 |
| GB | 1336884 | A | 11/1973 |
| GB | 1566815 | A | 5/1980 |
| GB | 1567895 | A | 5/1980 |
| GB | 2322298 | A | 8/1998 |
| JP | 2000189534 | A | 7/2000 |
| JP | 2003091785 | A | 3/2003 |
| WO | WO-2012008708 | A1 | 1/2012 |

* cited by examiner

HERMETICALLY SEALED PORTABLE FIRE EXTINGUISHER WITH PRESSURE INDICATOR

CROSS-REFERENCE TO RELATED APPLICATION

This application is a divisional of U.S. patent application Ser. No. 16/109,055, filed Aug. 22, 2018, which is a divisional of U.S. patent application Ser. No. 15/074,234, filed Mar. 18, 2016, which claims the benefit of priority to U.S. Provisional Patent Application No. 62/139,855 filed Mar. 30, 2015, all of which are incorporated by reference herein in their entirety.

BACKGROUND OF THE INVENTION

1. Field of the Invention

The subject invention is directed to portable fire extinguishers, and more particularly, to a portable fire extinguisher having a discharge valve with a flexible hermetic seal, along with a visual pressure indicator.

2. Description of Related Art

Discharge valves used on stored pressure portable fire extinguishers have a pressure indicator to monitor interior pressure during storage, and a stem to control the flow of a pressurized fire extinguishing agent during discharge. The pressure indicator is periodically inspected to ensure that the fire extinguisher is fully pressurized and ready for use in the event of a fire. Bourdon tube type pressure indicators have been utilized in fire extinguishers for decades, as disclosed for example in U.S. Pat. No. 3,815,421.

Bourdon tube type pressure indicators are expensive to fabricate and provide potential leak points within the discharge valve. These potential leak points exist at the connection between the bourdon tube and the valve body, as well as in the tube itself, which can develop cracks resulting from the flattening, coiling and welding processes used during manufacture.

It would be beneficial therefore, to provide a portable fire extinguisher with a pressure indicator that is less expensive and less susceptible to leaks than typical bourdon tube type pressure indicators to monitor pressure within the fire extinguisher during storage. It would also be beneficial to eliminate the potential leak point at the piston that controls flow during activation. During storage the piston is in a closed position to retain pressure. Imperfections or contamination at its sealing surfaces can result in leakage.

SUMMARY OF THE INVENTION

The subject invention is directed to a new and useful stored pressure portable fire extinguisher that includes a cylinder for storing a pressurized fire extinguishing agent, a novel pressure indicator mechanism that overcomes the disadvantages that have been associated with prior art bourdon tube type pressure indicators typically employed in portable fire extinguishers, and a novel sealing method that reduces leakage typically associated with piston type valves.

The cylinder includes a neck portion that defines an outlet. A flexible hermetic seal is supported across the outlet of the cylinder. The flexible hermetic seal is adapted and configured to transition between three different conditions. The first condition is an unexpanded condition that corresponds to an unpressurized cylinder. The second condition is an expanded condition that corresponds to a pressurized cylinder. The third condition is a bursted condition that corresponds to an opened cylinder.

In accordance with a preferred embodiment of the subject invention, the fire extinguisher includes a valve assembly that is threadably associated with the neck portion of the cylinder and it secures the hermetic seal in place across the outlet of the cylinder. The valve assembly includes a valve housing having an interior cavity with an exit port and a piston. The piston has an elongated stem and a lower body portion. A sealing ring is positioned within an annular groove surrounding the lower body portion of the piston for sealing against an interior surface of the valve housing. This controls the egress of pressurized fire extinguishing agent from the exit port of the valve housing during use.

A siphon tube extends downwardly into the cylinder from the neck portion thereof for delivering pressurized fire extinguishing agent to the outlet of the cylinder. An upper portion of the siphon tube defines a recess for accommodating an outer rim portion of the flexible hermetic seal, such that the rim is secured between an interior wall of the valve housing and the upper portion of the siphon tube.

The piston of the valve assembly is mounted for movement within the interior cavity of the valve housing between three different positions. The first position is a seated position that corresponds to an unpressurized cylinder, in which the lower body portion of the piston is in contact with the flexible seal while the seal is in an unexpanded condition. The second position is a lifted position that corresponds to a pressurized cylinder, in which the lower body portion of the piston remains in contact with the flexible seal while the seal is in an expanded condition. The third position is an activated position that corresponds to an opened cylinder outlet, in which the lower body portion of the piston is displaced from and out of contact with the flexible seal, allowing the seal to burst and open the outlet of the cylinder.

A pressure indicator beam extends perpendicularly outward from the stem of the piston, through a window in a side wall of the valve assembly to provide a visual indication of a pressure level within the cylinder. A coiled spring is positioned around an upper portion of the stem between the pressure indicator beam and a top wall of the valve housing. The force of the coiled biasing spring opposes the expansion of the hermetic seal, indicating the amount of pressurization in the cylinder.

A release pin is operatively associated with the valve assembly and it is mounted for movement between a locked condition in which the piston is maintained in the pressurized position and an unlocked condition in which the piston is free to move to the activated position. The release pin includes axially spaced apart upper and lower parallel retention arms that intersect the stem of the piston. The upper arm is positioned to retain the pressure indicator beam when the piston is in the pressurized position, and the lower arm is positioned to retain a coiled compression spring in a compressed condition.

A coiled compression spring is positioned around an upper portion of the stem of the piston between the pressure indicator beam and a bottom wall of the valve housing. The valve assembly further includes a lever arm adapted and configured to move the piston within the valve assembly against the bias of the coiled compression spring to permit pressurized fire extinguishing agent to be selectively released through the exit port of the valve assembly.

In accordance with another preferred embodiment of the subject invention, the valve assembly includes a valve housing having an interior cavity with an exit port and a piston having an elongated stem, a lower body portion and a sharpened projection depending downwardly from the lower body portion. In this embodiment of the invention, the piston is mounted for movement within the interior cavity of the valve housing between two positions. The first position is a seated position in which the lower body portion of the piston is biased against an interior wall of the valve housing by a coiled retention spring and the sharpened projection is spaced from the flexible hermetic seal. The second position is an activated position in which the lower body portion of the piston compresses the coiled retention spring and the sharpened projection pierces the flexible hermetic seal, causing the seal to burst and open the outlet of the cylinder.

A pressure indicator beam extends upwardly from a lower end of the coiled spring, through a window in a side wall of the valve assembly to provide a visual indication of a pressure level within the cylinder. The valve assembly further includes a lever arm adapted and configured to move the piston within the valve assembly against the bias of the coiled retention spring, to initially pierce the flexible hermetic seal and subsequently permit pressurized fire extinguishing agent to be selectively released through the exit port of the valve assembly.

The subject invention is further directed to a new and useful method of filling a portable fire extinguisher with a pressurized fire extinguishing agent. The method includes the steps of providing a cylinder having threaded neck portion defining an opening; providing a valve housing having a threaded interior cavity defining an injection port; threadably engaging the valve housing onto the neck portion of the cylinder in such a manner so that the injection port remains in fluid communication with the opening of the cylinder; injecting a pressurized fire extinguishing agent or propellant gas into the opening of the cylinder through the injection port; and then threadably securing the valve housing onto the neck portion of the cylinder in such a manner so that the injection port is blocked by the neck portion of the cylinder.

Preferably, the method further includes the step of positioning a separate sealing member around the valve housing and the neck portion when the valve housing is threadably engaged to the neck portion and the injection port is in fluid communication with the opening of the cylinder. This sealing member is removed prior to threadably securing the valve housing to the neck portion after it has been filled with a fire extinguishing agent or propellant gas.

These and other features of the subject invention and the manner in which it is manufactured and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the hermetically sealed portable fire extinguisher of the subject invention without undue experimentation, preferred embodiments thereof will be described in detail herein below with reference to certain figures, wherein.

DETAILED DESCRIPTION OF PREFERRED EMBODIMENTS

Figure 1:
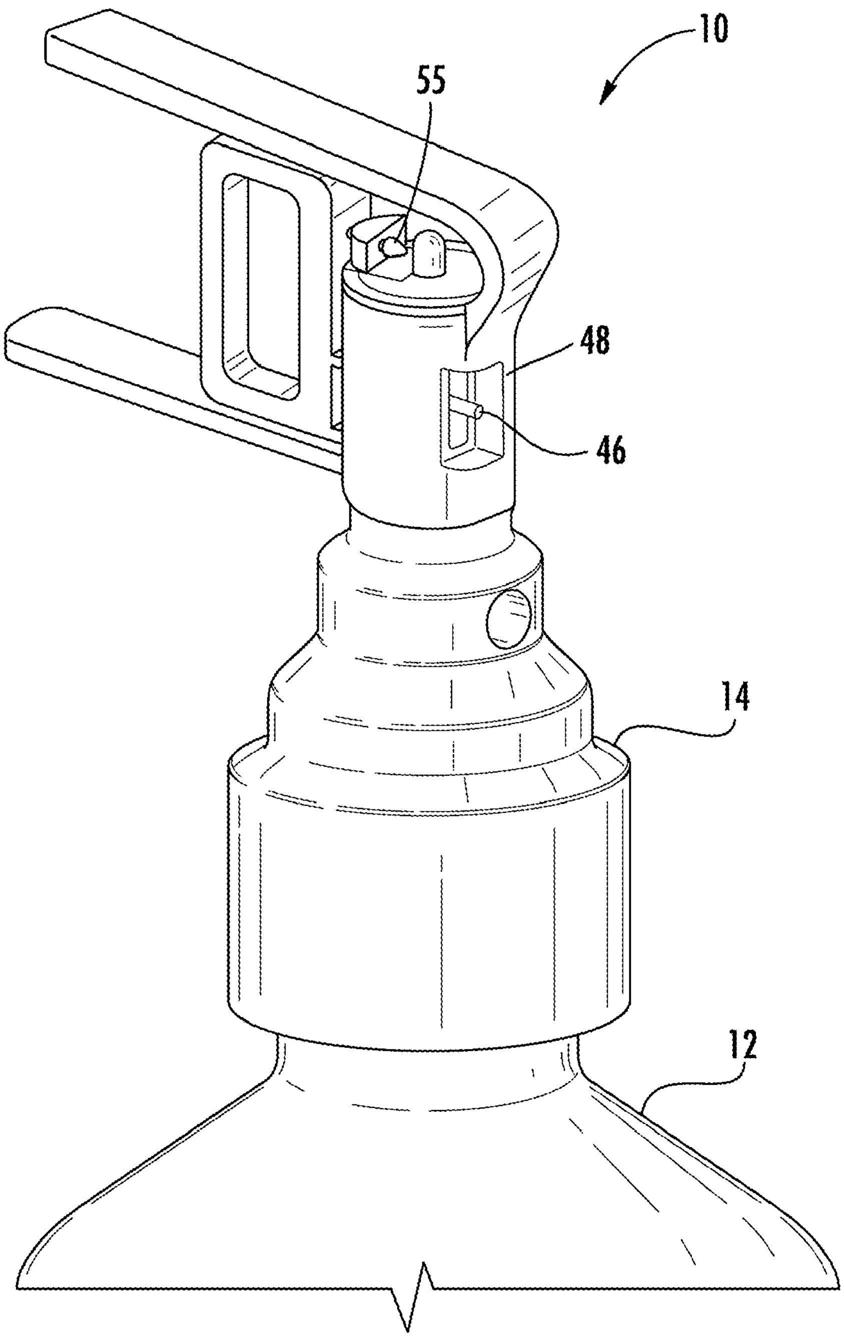
FIG. 1 is a perspective view of a hermetically sealed portable fire extinguisher constructed in accordance with one embodiment of the subject invention.

Referring now to the drawings, wherein like reference numerals identify similar structural features or aspects of the subject invention, there is illustrated in FIG. 1 a portable fire extinguisher constructed in accordance with a preferred embodiment of the subject invention and designated generally by reference numeral 10. Fire extinguisher 10 includes a cylinder 12 for storing a pressurized fire extinguishing agent and a valve assembly 14 for manually discharging the agent from the cylinder 12 during use. The agent may be a gaseous agent, dry powdered chemical agent or a fluid media depending upon the intended use of the fire extinguisher.

Figure 2:
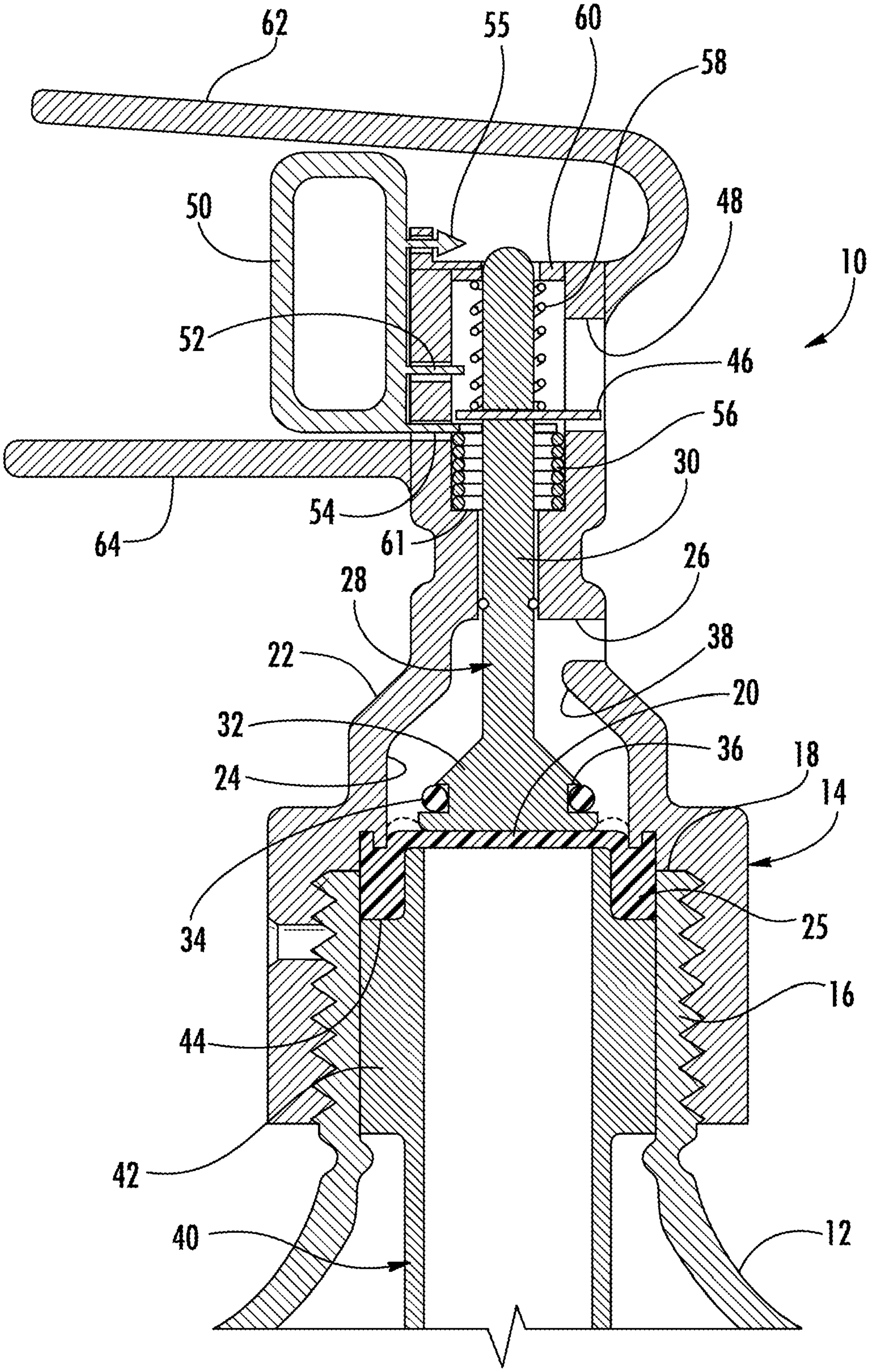
FIG. 2 is a side elevational view of the portable fire extinguisher of FIG. 1, in cross-section, illustrating the flexible hermetic seal in an unexpanded condition corresponding to an unpressurized cylinder, with the pressure indicator in an empty position.

Referring to FIG. 2, the cylinder 12 of fire extinguisher 10 includes a neck portion 16 that defines an outlet 18 for the cylinder 12. The neck portion 16 has a threaded outer surface. An alternate embodiment could utilize an inner threaded surface for the neck portion 16. A flexible hermetic seal 20 is supported across the outlet 18 of the cylinder 12. The flexible hermetic seal 20 is adapted and configured to transition between three different conditions. The first condition is an unexpanded condition that corresponds to an unpressurized cylinder. The second condition is an expanded condition that corresponds to a pressurized cylinder. The third condition is a bursted condition that corresponds to an opened cylinder.

The valve assembly 14 is threadably associated with the neck portion 16 of the cylinder 12 and it secures the hermetic seal 20 in place across the outlet 18 of the cylinder 12. The valve assembly 14 includes a valve housing 22 having an interior cavity 24 with a threaded inner surface for cooperating with the threaded outer surface of the neck portion 16 of the cylinder 12. An alternate embodiment could utilize an outer threaded surface for the valve housing 22 for cooperating with a threaded inner surface of the neck portion 16 of the cylinder 12. The valve housing 22 has an exit port 26 and a piston 28. The piston 28 has an elongated stem 30 and a lower body portion 32. A sealing ring 34 is positioned within an annular groove 36 surrounding the lower body portion 32 of the piston 28 for sealing against an interior surface 38 of the valve housing 22 to control the egress of pressurized fire extinguishing agent from the exit port 26 of the valve housing 22 during use.

A siphon tube 40 extends downwardly into the cylinder 12 from the neck portion 16 for delivering pressurized fire extinguishing agent to the outlet 18 of the cylinder 12. An upper portion 42 of the siphon tube 40 defines an annular recess 44 for accommodating an outer rim portion 25 of the flexible hermetic seal 20, such that the rim 25 is secured between an interior wall of the valve housing 22 and the upper portion 42 of the siphon tube 40. Alternate embodiments could have an annular recess created between the cylinder 12, neck portion, and the valve housing 22 defining an annular recess for accommodating the outer rim portion 25 of the flexible hermetic seal 20.

Figure 3:
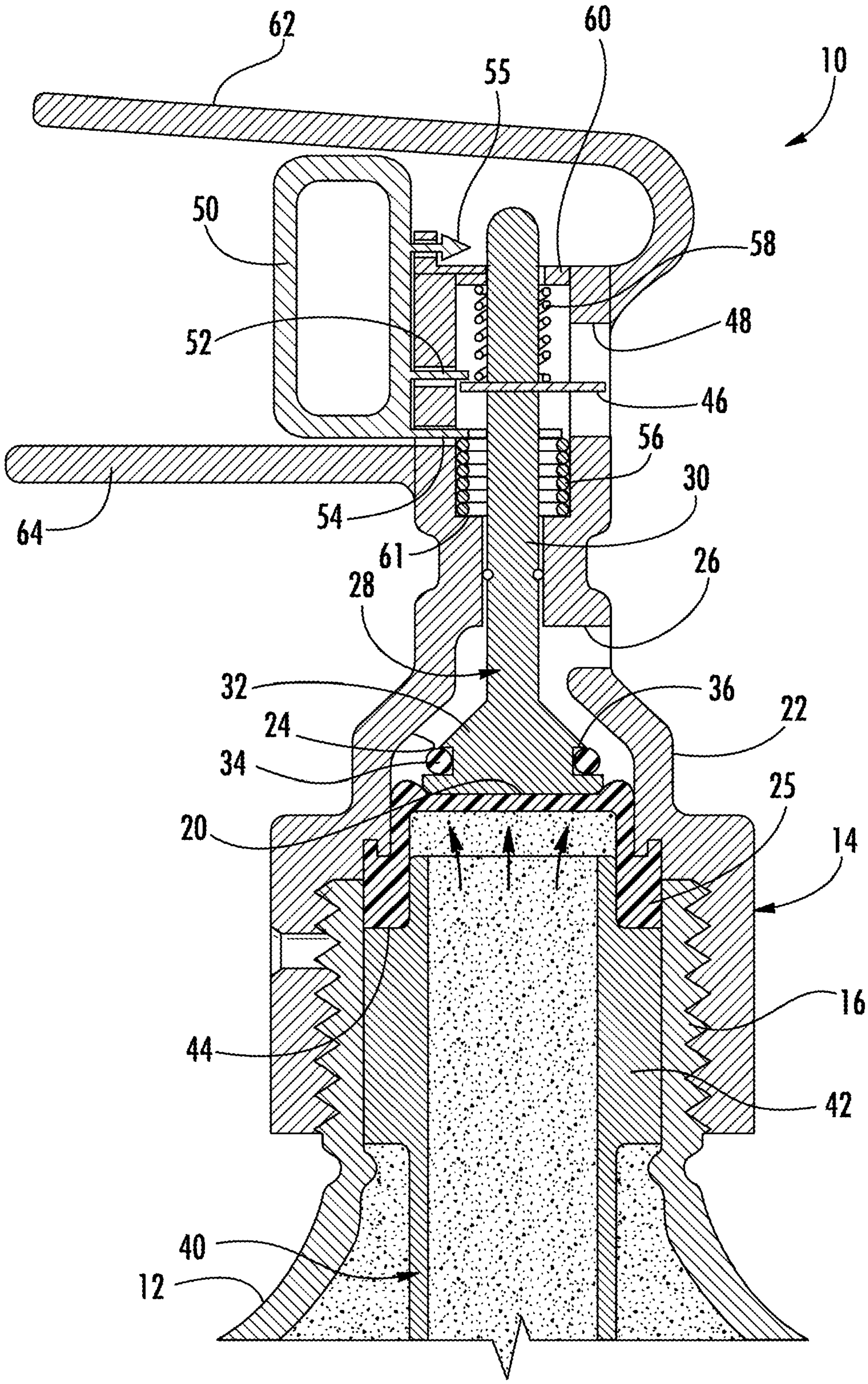
FIG. 3 is a side elevational view of the portable fire extinguisher of FIG. 1, in cross-section, illustrating the flexible hermetic seal in an expanded condition corresponding to a pressurized cylinder, with the pressure indicator in a full position.
Figure 4:
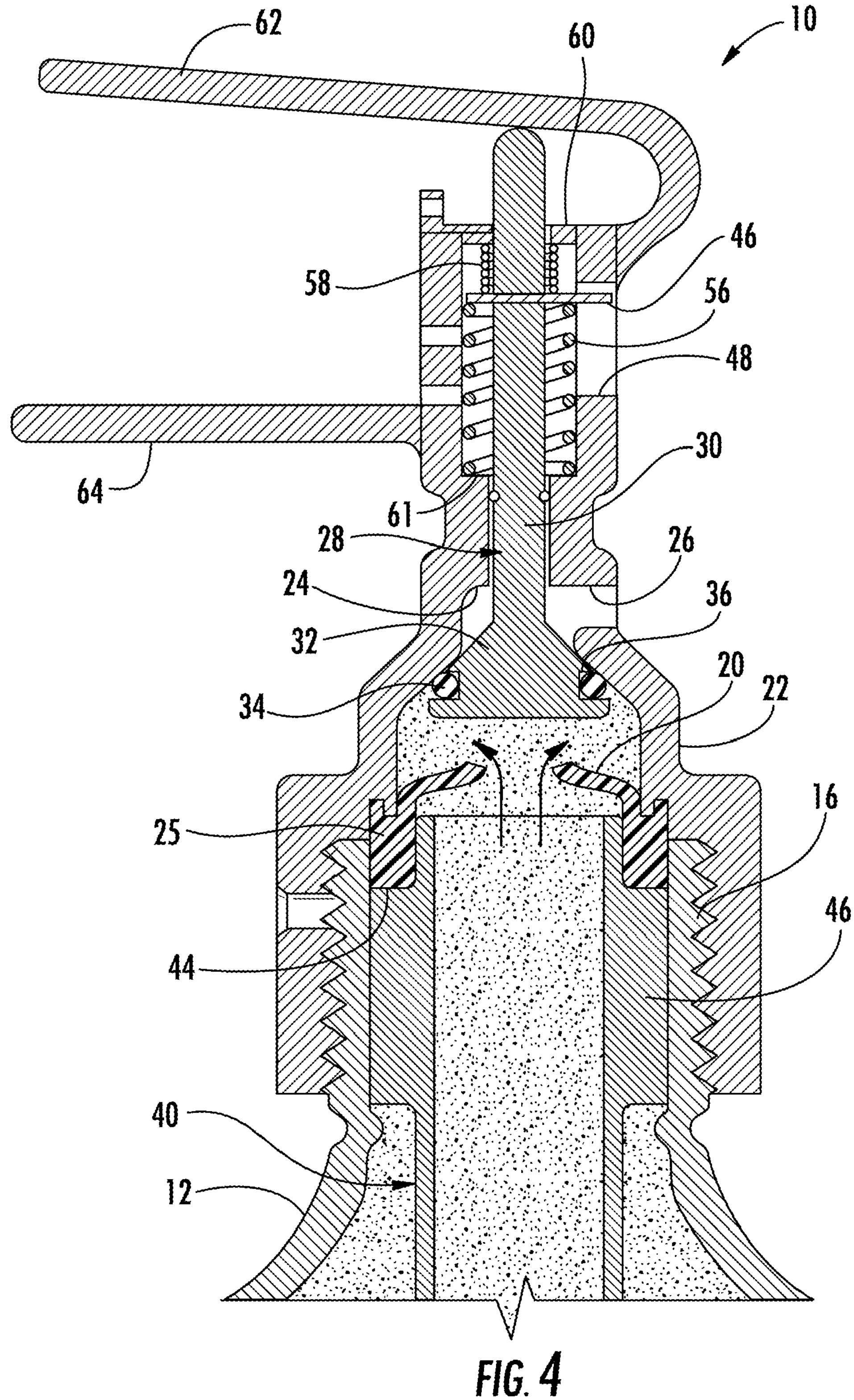
FIG. 4 is a side elevational view of the portable fire extinguisher of FIG. 1, in cross-section, illustrating the flexible hermetic seal in a bursted condition corresponding to an open cylinder ready for discharge.

The piston 28 of the valve assembly 14 is mounted for movement within the interior cavity 24 of the valve housing 22 between three different operational positions. The first positon is a seated position shown in FIG. 2 that corresponds to an unpressurized cylinder. In this first position, the lower body portion 32 of the piston 28 is in contact with the flexible seal 20 while the seal is in an unexpanded condition. The second position is a lifted position shown in FIG. 3 that corresponds to a pressurized cylinder. In this second position, the lower body portion 32 of the piston 28 remains in contact with the flexible seal 20 while the seal is in an expanded condition. The third position is an activated position shown in FIG. 4 that corresponds to an opened cylinder outlet 18. In this third position, the lower body portion 32 of the piston 28 is displaced from and out of contact with the flexible seal 20, allowing the seal 20 to burst and open the outlet of the cylinder.

With continuing reference to FIG. 2, a pressure indicator beam 46 extends perpendicularly outward from the stem 30 of the piston 28, through a window 48 in a side wall of the valve assembly housing 22 to provide a visual indication of a pressure level within the cylinder 12 (e.g., empty or full). By way of example, FIG. 1 shows the indicator beam 46 in a full position within window 48 of valve assembly 14.

A release pin 50 with a latch tab 55 is operatively associated with the valve assembly 14 and is mounted for movement between a locked condition (FIG. 3) in which the piston 28 is maintained in the pressurized position and an unlocked condition (FIG. 4) in which the piston 28 is free to move to the activated position. The release pin 50 includes axially spaced apart upper and lower parallel retention arms 52 and 54 intersecting the stem 30 of the piston 28. The upper arm 52 is positioned to retain the pressure indicator beam 46 when the piston 28 is in the pressurized position of FIG. 3, and the lower arm 54 is positioned to retain a coiled compression spring 56 in a compressed condition. Coiled compression spring 56 is positioned around an upper portion of stem 30 of piston 28 between the lower retention arm 54 of release pin 50 and a bottom wall 61 of the valve assembly housing 22.

Figure 5:
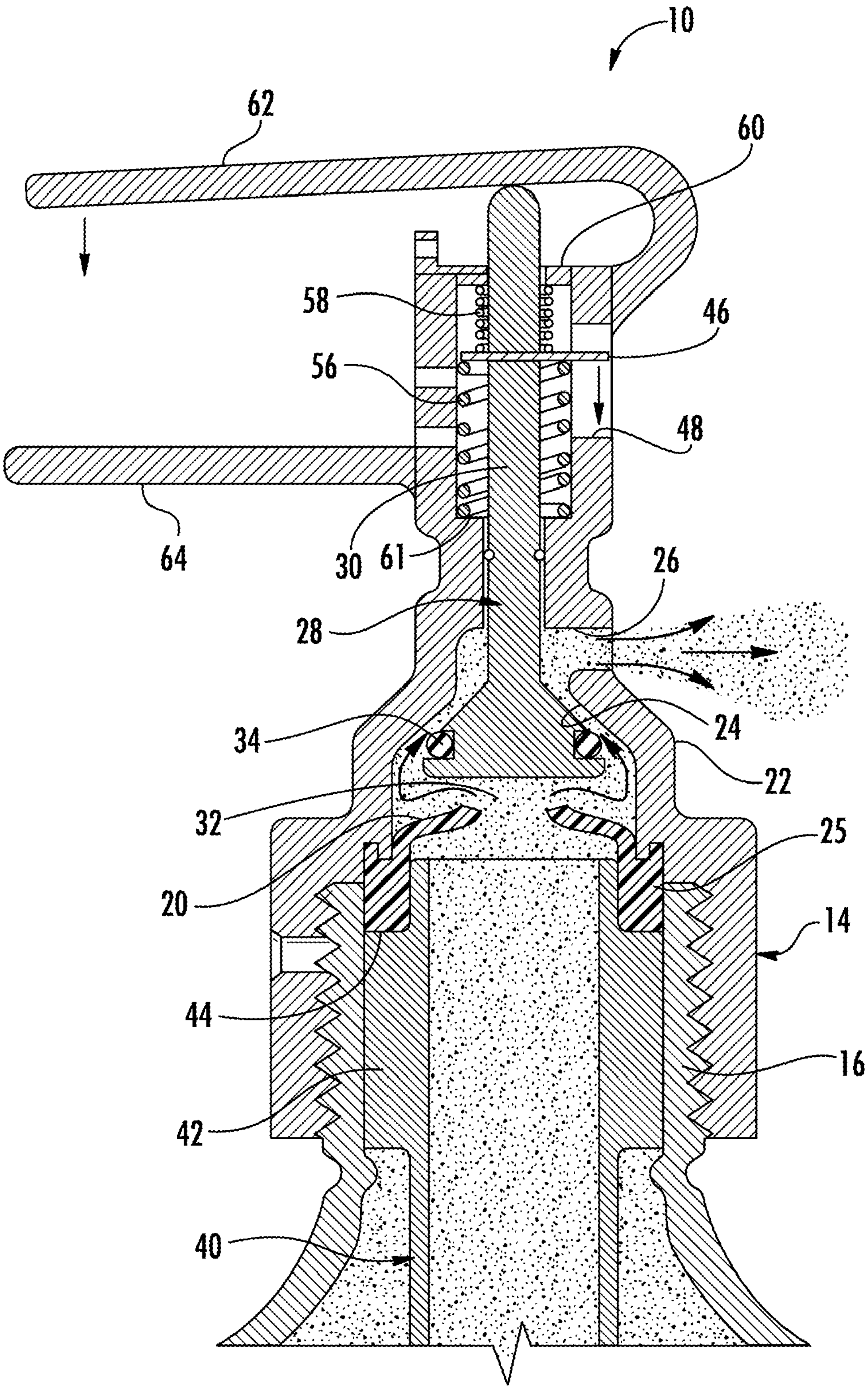
FIG. 5 is a side elevational view of the portable fire extinguisher of FIG. 1, in cross-section, illustrating the lever in a depressed condition to unseal the piston body and discharge the cylinder.

A coiled biasing spring 58 is positioned around an upper portion of the stem 30 of the piston 28 between the pressure indicator beam 46 and a top wall 60 of the valve assembly housing 22. The valve assembly 14 further includes a lever arm 62 adapted and configured to move the piston 28 within the valve assembly 14 against the bias of the coiled compression spring 56 to permit pressurized fire extinguishing agent to be selectively released through the exit port 26 of the valve assembly 14, as shown in FIG. 5. A fixed handle 64 is also provided for cooperative use with lever arm 62.

Figure 6:
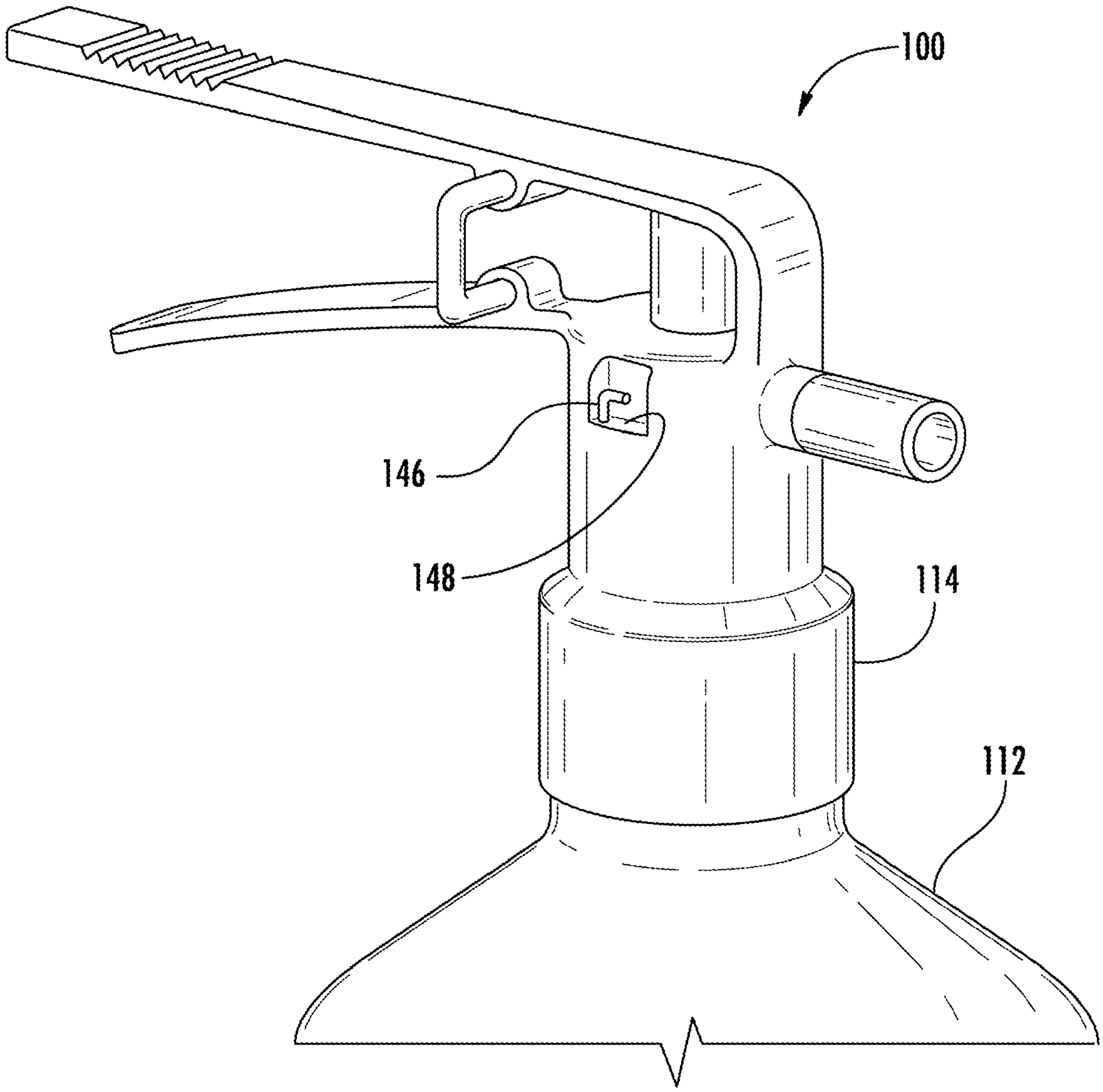
FIG. 6 is a perspective view of a hermetically sealed portable fire extinguisher constructed in accordance with another embodiment of the subject invention.
Figure 7:
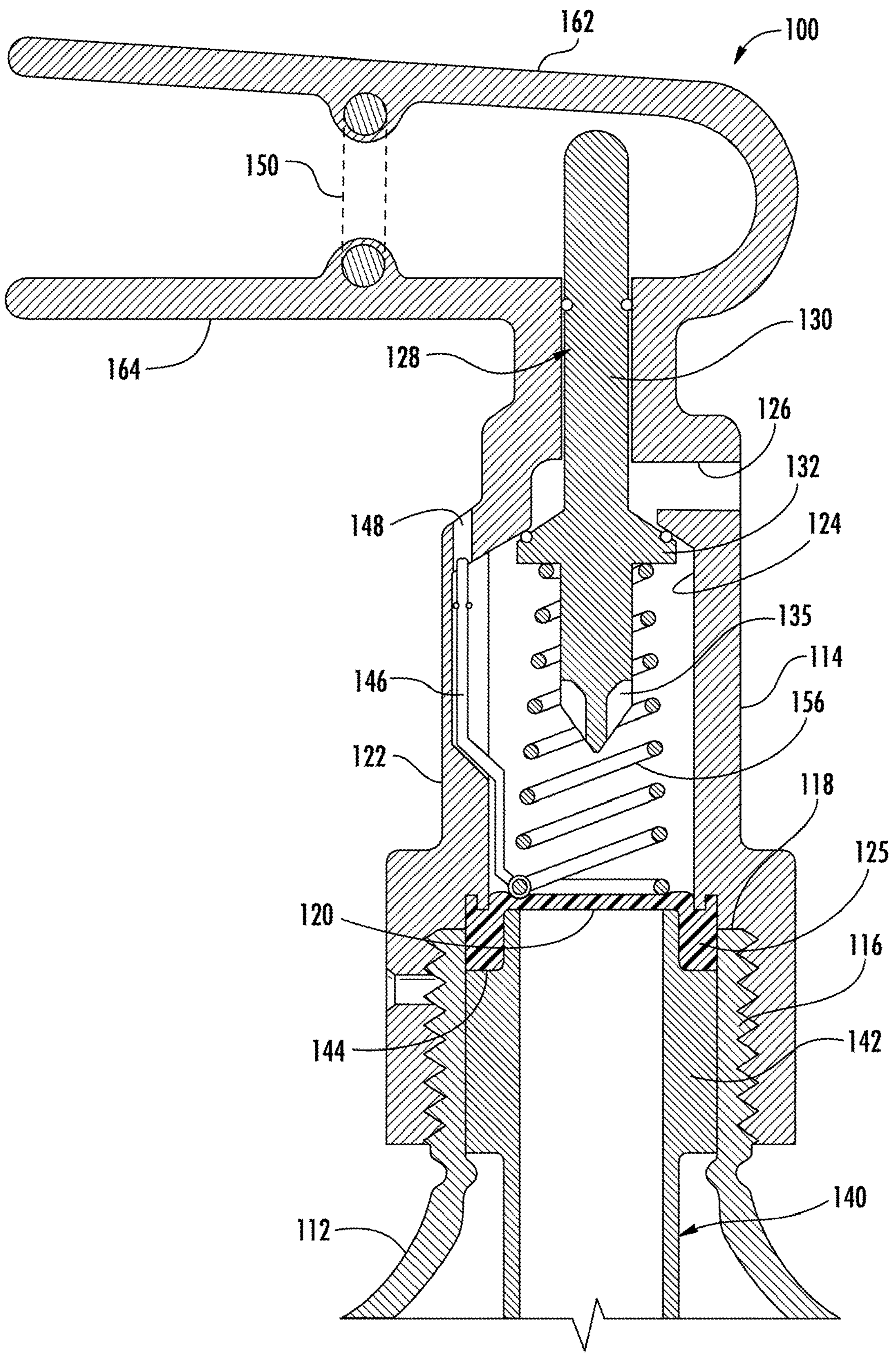
FIG. 7 is a side elevational view of the portable fire extinguisher of FIG. 6, in cross-section, illustrating the flexible hermetic seal in an unexpanded condition corresponding to an unpressurized cylinder with the pressure indicator in an empty position.

Referring to FIG. 6, there is illustrated another portable fire extinguisher constructed in accordance with a preferred embodiment of the subject invention and designated generally by reference numeral 100. As illustrated in FIG. 7, fire extinguisher 100 includes a cylinder 112 and a valve assembly 114. The cylinder 112 has a threaded neck portion 116 with an opening 118. A flexible hermetic seal 120 extends across the opening 118 of the neck portion 116 of cylinder 112. A siphon tube 140 extends from the opening 118 through the neck portion 116 and into the cylinder 112 for delivering fire extinguishing agent from the cylinder to the valve assembly 114. The siphon tube 140 includes an upper portion 142 with an annular seat 144 for accommodating the outer rim 125 of hermetic seal 120. An alternate embodiment could provide an annular seat 144 between the lower portion of valve housing 122 and the upper neck portion 116 of cylinder 112.

Figure 8:
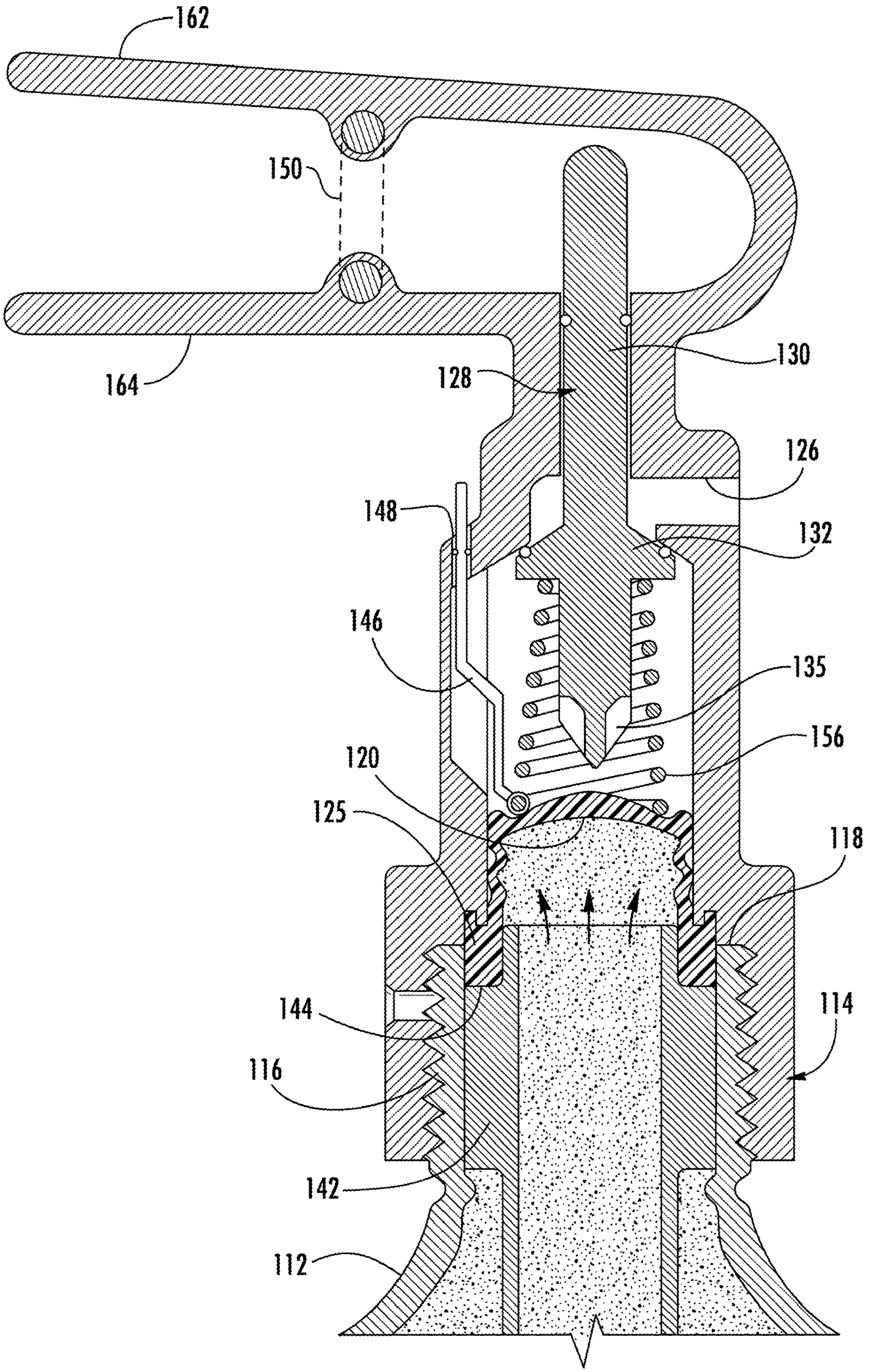
FIG. 8 is a side elevational view of the portable fire extinguisher of FIG. 6, in cross-section, illustrating the flexible hermetic seal in an expanded condition corresponding to a pressurized cylinder, with the pressure indicator in a full position.

Valve assembly 114 includes a valve housing 122 having an interior cavity 124 with an exit port 126. The valve assembly 114 further includes a piston 128 having an elongated stem 130, a lower body portion 132 and a sharpened projection 135 depending downwardly from the lower body portion 132. The piston 128 is mounted for movement within the interior cavity 124 of the valve housing 122 between two positions. The first position is a seated position shown in FIG. 8. In this position, the lower body portion 132 of the piston 128 is biased against an interior wall of the valve housing 122 by a coiled retention spring 156 and the sharpened projection 135 is spaced from the flexible hermetic seal 120. The second position is an activated position shown in FIG. 9. In this position, the lower body portion 132 of the piston 128 compresses the coiled retention spring 156 and the sharpened projection 135 pierces the flexible hermetic seal 120, causing the seal 120 to burst and open the outlet 118 of the cylinder 120.

Figure 9:
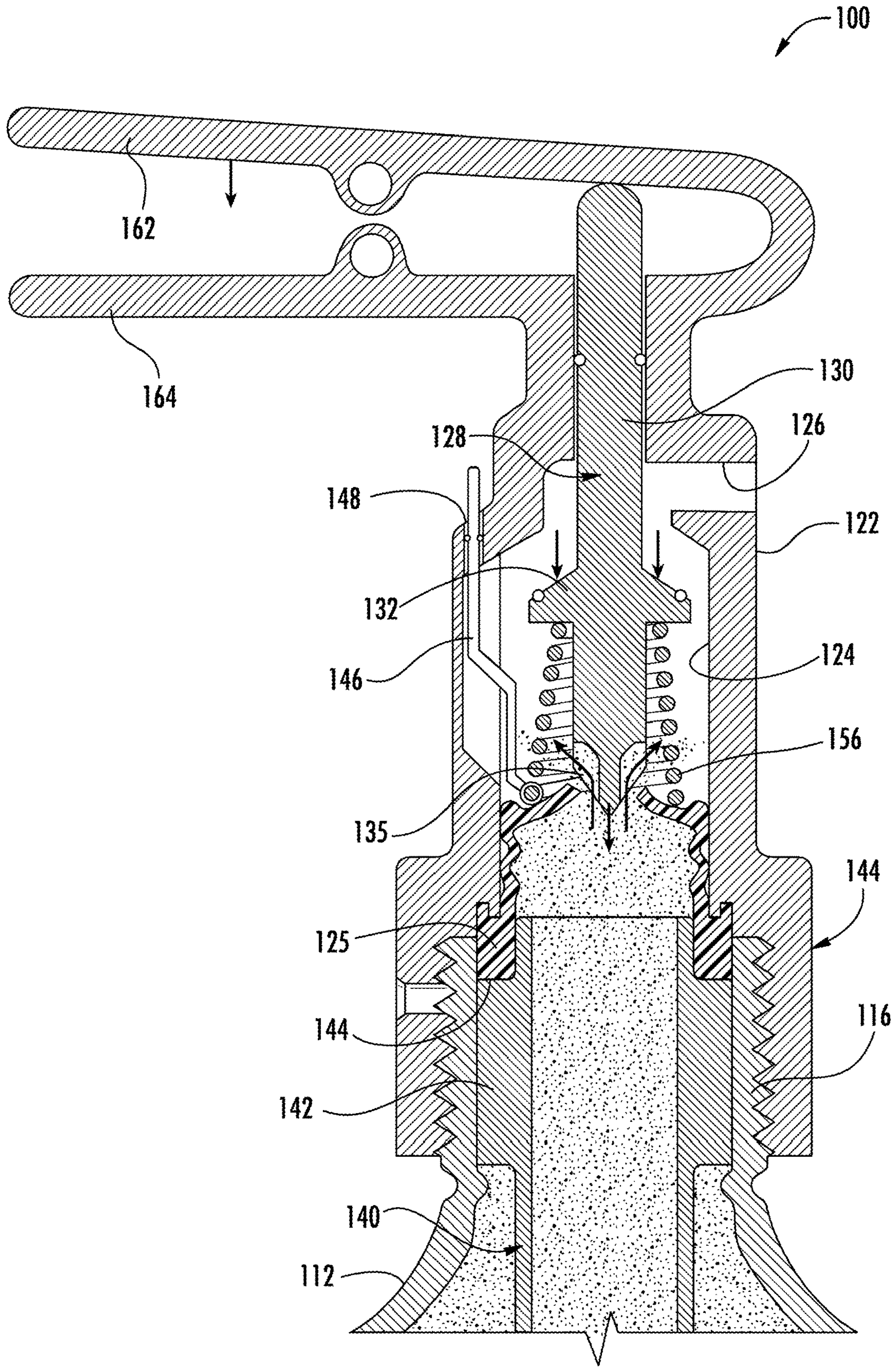
FIG. 9 is a side elevational view of the portable fire extinguisher of FIG. 6, in cross-section, illustrating the flexible hermetic seal being pierced to open the cylinder so it is ready for discharge.
Figure 10:
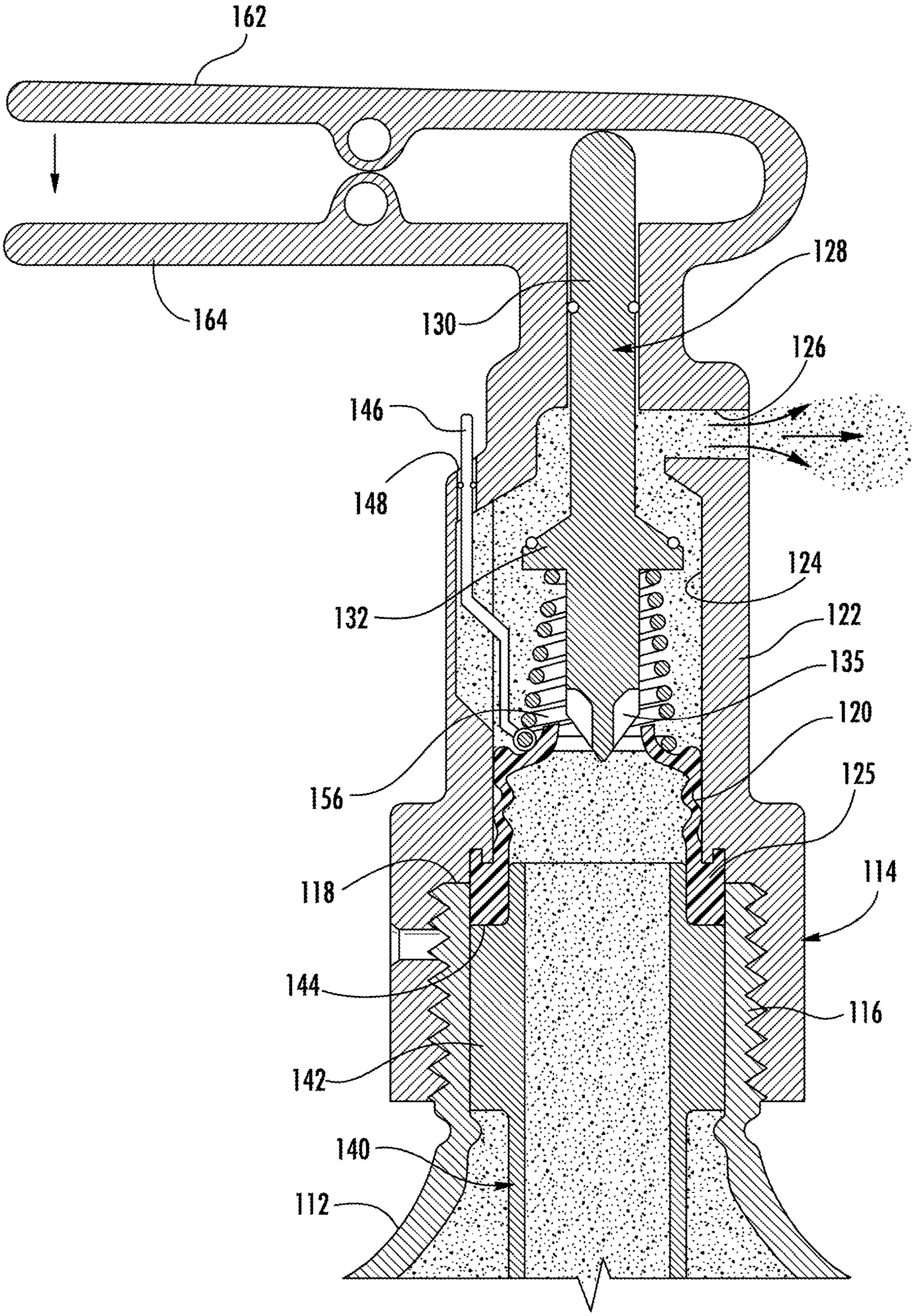
FIG. 10 is a side elevational view of the portable fire extinguisher of FIG. 6, in cross-section, illustrating the lever in a depressed condition to unseal the piston body and discharge the cylinder.

A pressure indicator beam 146 extends upwardly from a lower end of the coiled retention spring 125, through a window 148 formed in a side wall of the valve assembly 114 to provide a visual indication of a pressure level within the cylinder 112. By way of example, in FIG. 6, the pressure indicator 146 is shown in a full position in window 148. The valve assembly 114 further includes a lever arm 162 adapted and configured to move the piston 128 within the valve assembly 114 against the bias of the coiled retention spring 156 to initially pierce the flexible hermetic seal 120 as shown in FIG. 9, and subsequently permit pressurized fire extinguishing agent to be selectively released through the exit port 126 of the valve assembly 114, as shown in FIG. 10. The lever arm 162 cooperates with a fixed handle 164. A removable lock ring 150 maintains lever arm 162 and handle 164 in a locked condition for storage. The lock 150 can be readily removed by a user to actuate the lever arm 162.

Figure 11:
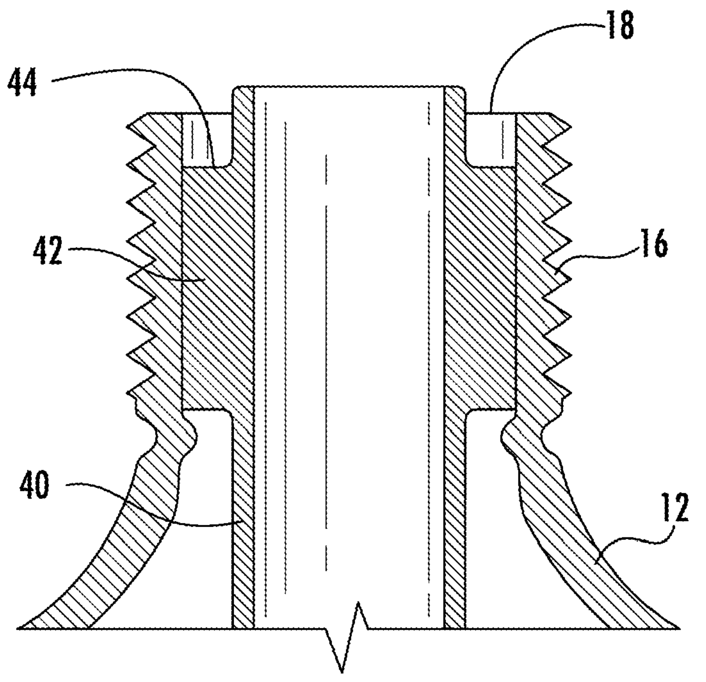
FIG. 11 is a localized side elevational view of the neck portion of the cylinder of the potable fire extinguisher of FIG. 1, in cross-section.
Figure 12:
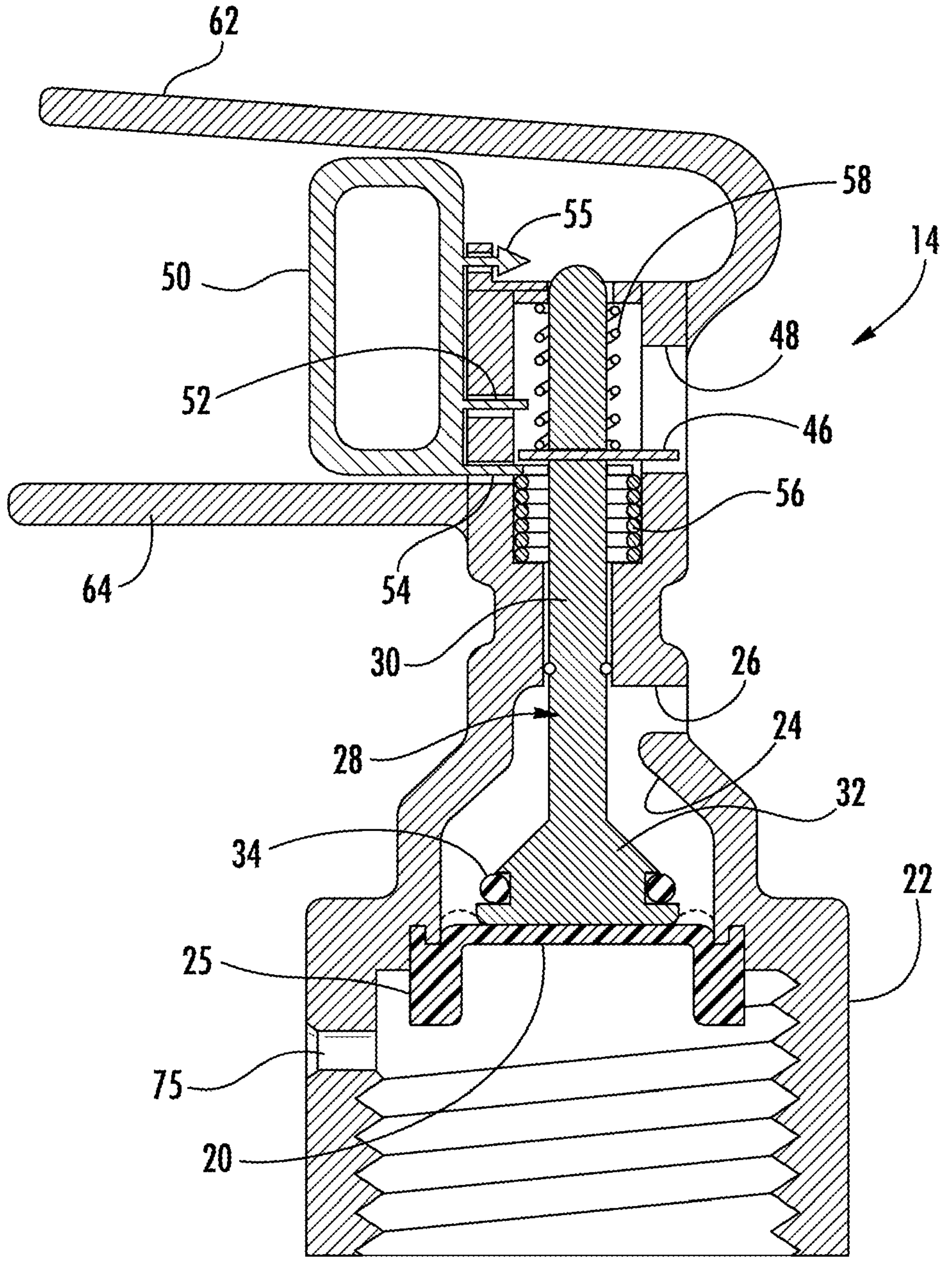
FIG. 12 is a side elevational view of the valve assembly of the portable fire extinguisher of FIG. 1, in cross-section, separate and apart from the neck portion of the cylinder shown in FIG. 11.

The subject invention is further directed to a new and useful method of filling a portable fire extinguisher with a pressurized fire extinguishing agent or propellant gas, such as, for example, the fire extinguisher of FIGS. 1 through 5. The filling method includes the initial steps of providing a cylinder 12 having threaded neck portion 16 defining an opening 18, as shown in FIG. 11, and providing a valve housing 22 having a threaded interior cavity defining an injection port 75, as shown in FIG. 12.

Figure 13:
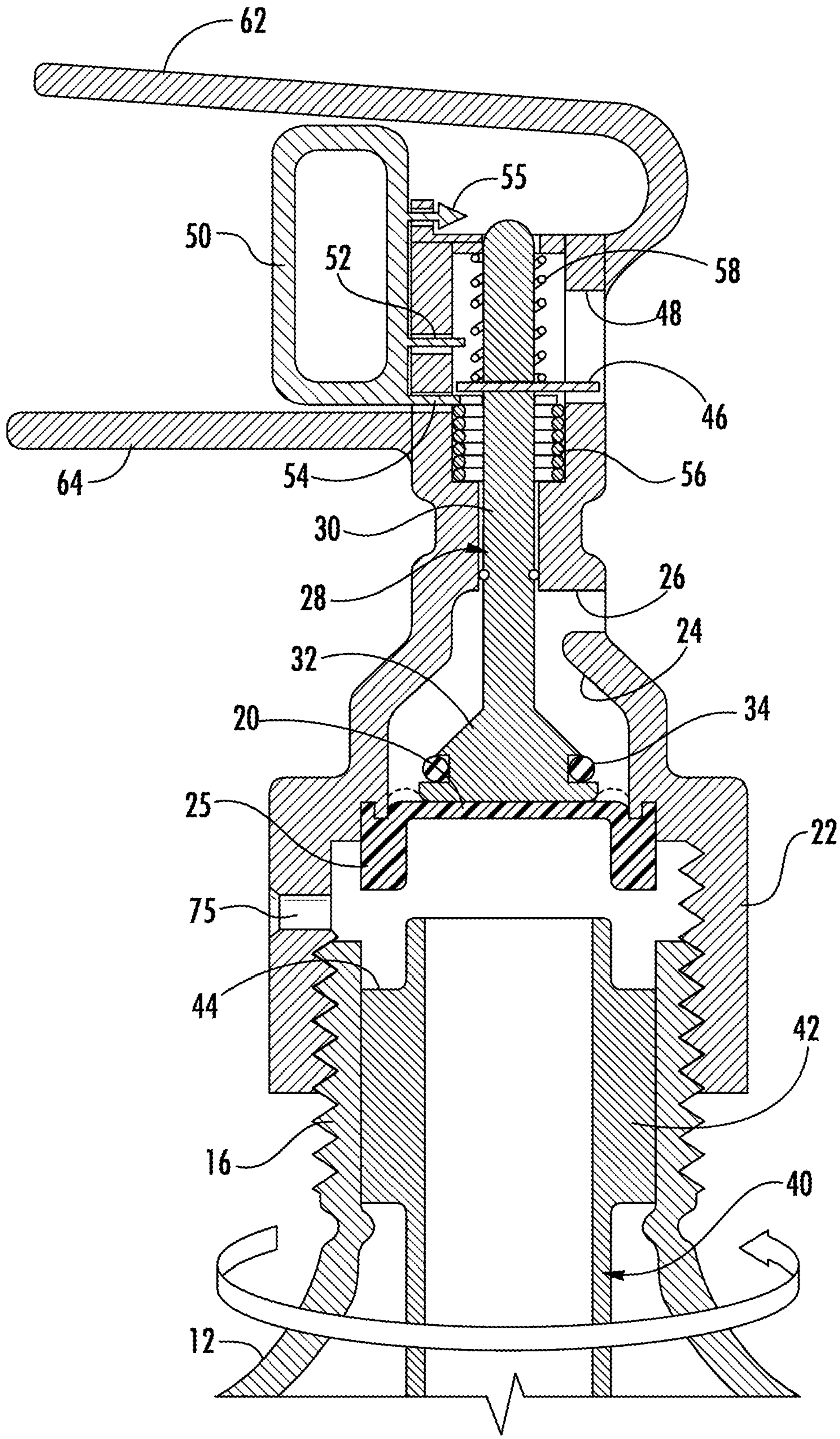
FIG. 13 is a side elevational view of the portable fire extinguisher of FIG. 1, in cross-section, with the valve assembly of FIG. 12 partially threaded onto the cylinder neck portion of FIG. 11 prior to filling the cylinder with a pressurized fire extinguishing agent.
Figure 14:
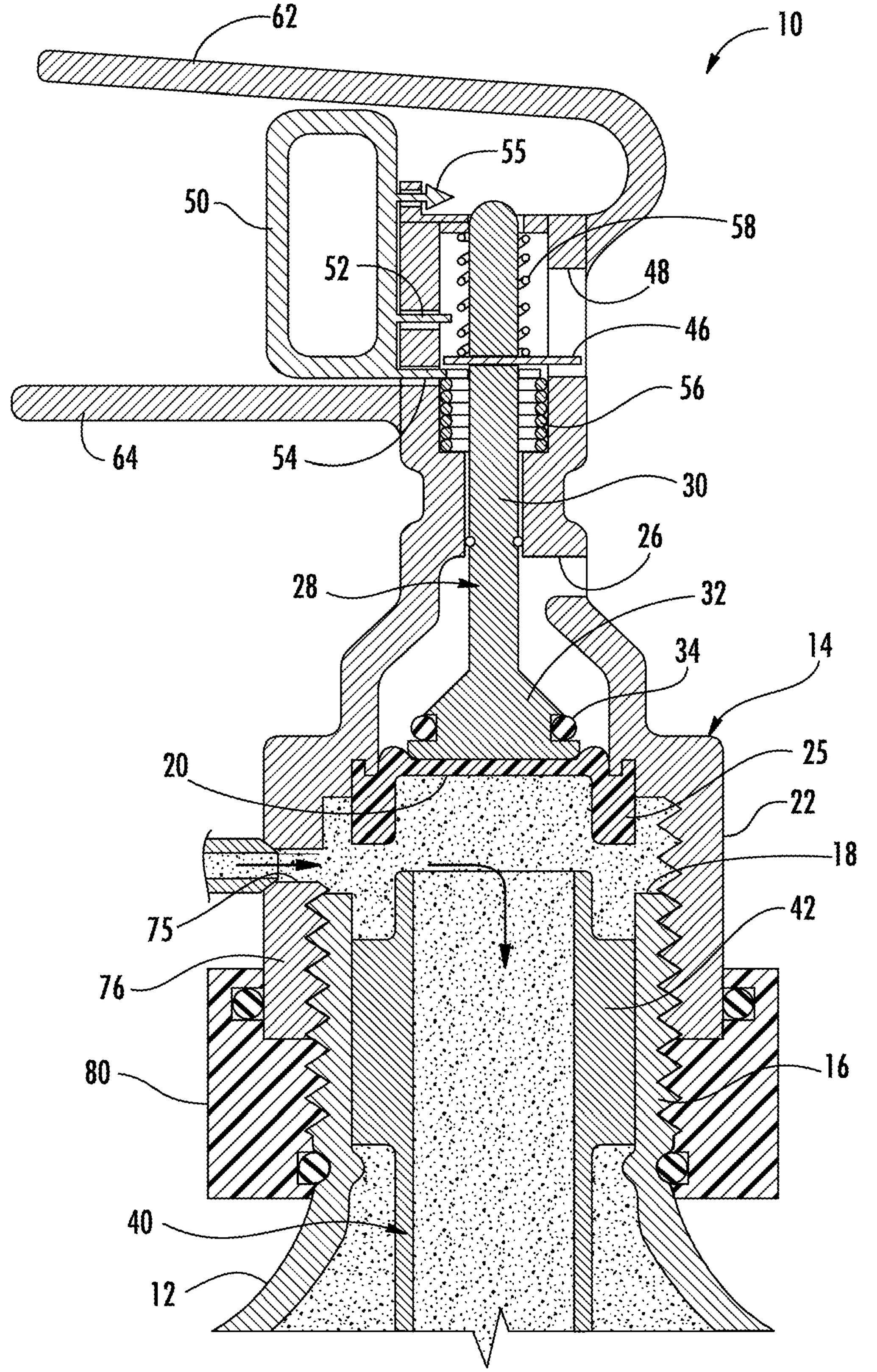
FIG. 14 is a side elevational view of the portable fire extinguisher of FIG. 1, in cross-section, with an exterior seal associated with the partially threaded valve assembly, when the cylinder is being filled with a pressurized fire extinguishing agent or propellant gas.
Figure 15:
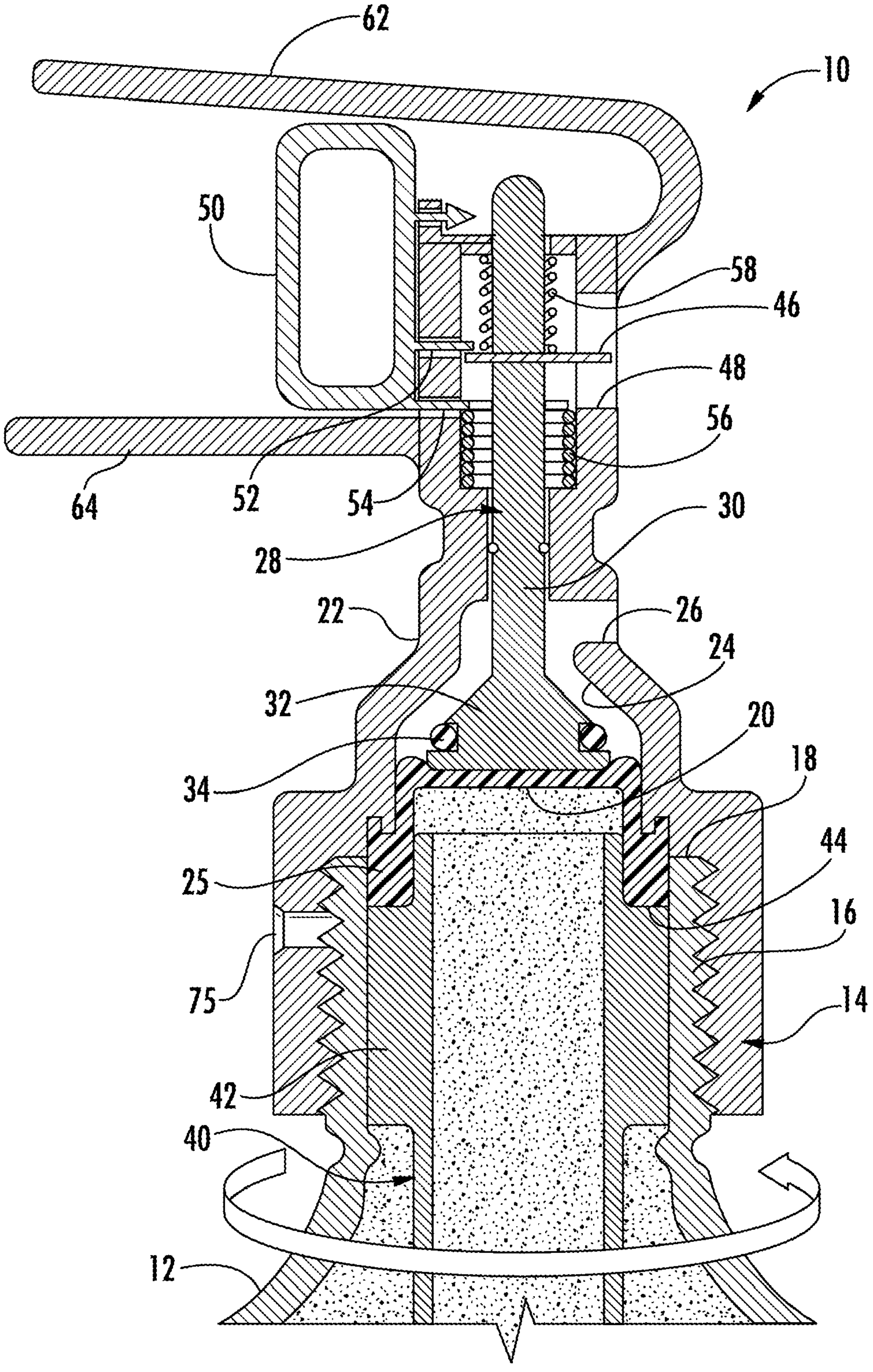
FIG. 15 is a side elevational view of the portable fire extinguisher of FIG. 1, in cross-section, with the valve assembly completely threaded on to the neck portion of the cylinder.

The method further includes the step of threadably engaging the valve housing 22 onto the neck portion 16 of the cylinder in such a manner so that injection port 75 remains in fluid communication with the opening of the cylinder 12, as shown in FIG. 13. Next, a pressurized fire extinguishing agent or propellant gas is injected into the injection port 75, through the opening 18 of the cylinder 12, and down into the cylinder through the siphon tube 40, as shown in FIG. 14. Then, the valve housing 22 is threadably secured onto the neck portion 16 of the cylinder 12 in such a manner so that the injection port 75 is blocked by the neck portion 16 of the cylinder 12, as shown in FIG. 15.

Preferably, the method further includes the step of positioning a separate sealing member 80 around the valve housing 22 and the neck portion 16 when the valve housing 22 is threadably engaged to the neck portion 16 and the injection port 75 is in fluid communication with the opening 18 of the cylinder 12, as shown in FIG. 14. This sealing member 80 is removed prior to threadably securing the valve housing 22 to the neck portion 16 after it has been filled with a fire extinguishing agent and propellant gas.

While the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. A method of filling a fire extinguisher with a pressurized fire extinguishing agent, comprising the steps of:

a) providing a cylinder having threaded neck portion defining an opening;

b) providing a valve housing having a threaded interior cavity defining an injection port and having a flexible hermetic seal disposed therein, wherein the flexible hermetic seal is configured and adapted to transition between an unexpanded condition, an expanded condition, and a bursted condition;

c) threadably engaging the valve housing onto the neck portion of the cylinder in such a manner so that injection port remains in fluid communication with the opening of the cylinder and the flexible hermetic seal is in the unexpanded condition;

d) positioning a second sealing member around and in contact with an outer diameter of both the valve housing and the neck portion of the cylinder with the valve housing threadably engaged to the neck portion and the injection port is in fluid communication with the opening of the cylinder;

e) injecting a pressurized fire extinguishing agent or propellant gas into the opening of the cylinder through the injection port;

f) removing the second sealing member; and g) threadably securing the valve housing onto the neck portion of the cylinder in such a manner so that the injection port is blocked by the neck portion of the cylinder and such that an outer rim portion of the flexible hermetic seal is in contact with a siphon tube of the cylinder and the flexible hermetic seal is in the expanded condition.

2. A method of filling a fire extinguisher with a pressurized fire extinguishing agent according to claim 1, wherein the steps of injecting a pressurized fire extinguishing agent into the opening of the cylinder through the injection port includes injecting a gaseous agent.

3. A method of filling a fire extinguisher with a pressurized fire extinguishing agent according to claim 1, wherein the steps of injecting a pressurized fire extinguishing agent into the opening of the cylinder through the injection port includes injecting a fluid agent.

4. A method of filling a fire extinguisher with a pressurized fire extinguishing agent according to claim 1, wherein the steps of injecting a pressurized fire extinguishing agent into the opening of the cylinder through the injection port includes injecting a dry chemical agent.

5. A method of filling a fire extinguisher with a pressurized fire extinguishing agent according to claim 1, wherein the siphon tube extends downwardly into the cylinder from the neck portion thereof, wherein, with the valve housing threadably secured to the neck portion of the cylinder, the outer rim portion of the flexible hermetic seal seats in a recess defined in an upper portion of the siphon tube such that the rim portion is secured between an interior wall of the valve housing and the upper portion of the siphon tube.

6. A method of filling a fire extinguisher with a pressurized fire extinguishing agent, comprising the steps of:

a) providing a cylinder having threaded neck portion defining an opening;

b) providing a valve housing having a threaded interior cavity defining an injection port and having a piston configured for movement within the valve housing, and a flexible hermetic seal disposed within the valve housing operatively associated with a lower body portion of the piston;

c) threadably engaging the valve housing onto the neck portion of the cylinder in such a manner so that injection port remains in fluid communication with the opening of the cylinder and such that the flexible hermetic seal is above and not in contact with a siphon tube of the cylinder;

d) positioning a second sealing member around and in contact with an outer diameter of both the valve housing and the neck portion of the cylinder with the valve housing threadably engaged to the neck portion and the injection port is in fluid communication with the opening of the cylinder;

e) injecting a pressurized fire extinguishing agent or propellant gas into the opening of the cylinder through the injection port;

f) removing the second sealing member; and g) threadably securing the valve housing onto the neck portion of the cylinder in such a manner so that the injection port is blocked by the neck portion of the cylinder and such that an outer rim portion of the flexible hermetic seal is in contact with a siphon tube of the cylinder and the lower body portion of the piston is in contact with the flexible hermetic seal.

* * * * *